United States Patent Office 3,491,832
Patented Jan. 27, 1970

3,491,832
PLUGGING FORMATIONS WITH FOAM
Syed H. Raza, Tulsa, Okla., assignor to Pan American Petroleum Corporation, Tulsa, Okla., a corporation of Delaware
No Drawing. Filed Aug. 12, 1968, Ser. No. 751,733
Int. Cl. E21b 33/13
U.S. Cl. 166—269    8 Claims

ABSTRACT OF THE DISCLOSURE

In plugging formations with foam, the foaming-agent solution is divided into several small batches which are alternated with small batches of gas to form a more effective foam. A batch of spacer liquid, such as water, may be used between the foaming-agent solution and gas to avoid excessive plugging of the formation near a well. The volumes of the batches of gas are very small to avoid foam breakage between treatments.

---

Plugging of earth formations by foam has been suggested. For example, uses of foams to decrease or prevent gas coning in oil wells and to improve displacement efficiency in secondary recovery have been proposed. There is little question that foams do plug formations. Several improvements, however, are desirable. First, the degree of reduction in permeability frequently is not as great as might be desired. Second, almost all foams eventually break. A foam of longer life will almost always be advantageous. Third, if an oil-soluble foaming agent is used, the presence of water decreases the degree of plugging and accelerates the rate of foam breakage. If a water-soluble foaming agent is used, the presence of oil reduces plugging and increases foam breakage.

With the foregoing problems in mind, an object of this invention is to provide a method which increases the degree of plugging provided by foams in earth formations. Another object is to provide a method which increases the life of foams in such formations. Still another object is to provide a method which decreases the adverse effects of water on oil foams and of oil on water foams in formations. An additional object is to provide an improved method for using foams to decrease gas coning in oil wells. Another specific object is to provide an improved method for using foams to improve oil recovery in secondary recovery operations such as water or gas drives. Still other objects will appear to those skilled in the art from the following description and claims.

In general, I accomplish the objects of my invention by dividing the foaming-agent solution and the gas used to generate the foam into small portions which are alternated. A small portion of foaming-agent solution is injected and followed by a little gas. Then, another small portion of foaming-agent solution is followed by another small portion of gas and so on until all the solution and gas have been introduced. After two or three alternations of foaming-agent solution and gas, the permeability of the formation to flow of water, gas, or oil is very greatly reduced. Therefore, in order to obtain an adequate distance of penetration of the foam into the formation, it is sometimes necessary to employ one additional step. This is the injection of a small batch of liquid free from foaming agent between the foaming-agent solution and the gas. This permits the foaming-agent solution and gas to penetrate the formation to a considerable distance from the well before there is sufficient mixing of the foaming-agent solution and gas to form a foam. The distance of penetration into the formation before foam forms is controlled by the volume of liquid between the foaming-agent solution and the gas.

The process will be better understood from an example in the laboratory where conditions could be carefully controlled and accurate measurements could be made. In this work, a tube 124 inches long and 3 inches in diameter was packed with sand of substantially uniform-size grains barely passing a No. 16 U.S. standard sieve. The resulting permeability of the sand pack was about 3,000 millidarcys. The sand-packed tubed was filled with crude oil from Wilcox formation in a field in southern Texas. A ¼ normal sodium chloride brine was then used to displace the oil down to an oil saturation of 25 percent of the pore volume.

A foaming-agent solution was forced into this oil-containing sand pack. The foaming agent was OK liquid, as described in U.S. Patent 3,330,346 Jacobs et al. The concentration was 1 percent by weight and the solvent was ¼ normal sodium chloride brine. The volume of solution was ¼ pore volume of the sand pack. The reason for selecting this volume was that previous experience had shown that the volume of foam formed in a sand pack of the type used here was generally about 4 times the volume of the foaming-agent solution used. Therefore, by using a volume of foaming-agent solution equal to about ¼ pore volume, the entire volume of the sand pack would be filled with foam.

After introducing the foaming-agent solution, nitrogen gas at about 105 pounds per square inch gauge was applied to the sand pack and a downstream pressure of about 95 pounds per square inch was maintained. This provided a pressure drop of about 1 pound per square inch per foot of length of the sand pack and an average pressure of about 100 pounds per square inch. Introduction of the gas caused generation of foam with almost complete blockage of flow. Breakage of foam by the oil in the sand pack permitted a gradual increase of gas flow. After return of considerable flow, the treatment with foaming-agent solution and gas was repeated. Again, after return of considerable flow, treatment with foaming-agent solution and gas was repeated. Flow rates after the various treatments are indicated in Table I.

TABLE I

| Time, minutes | Gas flow rates, ml./min. after treatments | | |
|---|---|---|---|
| | First treatment | Second treatment | Third treatment |
| 200 | 1 | 3 | ¼ |
| 300 | 5 | 4 | |
| 400 | 7 | 4.5 | ¾ |
| 600 | 9 | 5.5 | ¾ |
| 2,600 | | | 1 |

It will be apparent from the data in Table I that a single foam-generation treatment, even with OK liquid, provides only a temporary flow blockage in formation containing oil. A second treatment decreases the tendency to breakage and a third treatment provides a much lower permeability and a much more stable foam. The reasons for this increased degree of blocking and increased foam stability are not completely understood. The improved results are probably due in part to the lower oil content if the formation when the second treatment is made. Actually, however, the amount of oil is not greatly decreased by the second and third treatments, so decreased oil content can account for only a small part of the improvement. Part of the improvement may also be due to the earlier treatments blocking the larger pores so subsequent treatments can block smaller pores. This can account for the decreased rate of flow after later treatments, but does not explain the greater permanence of the foam. Still another possible explanation is that flow of later batches of foaming-agent solution along the continuous walls of the foam bubbles reinforces and rejuvenates these foams making them much more permanent. It is also possible that earlier foam treatments remove continuous films of oil leaving only oil droplets trapped and isolated in small pores. Subsequently formed foam bubbles then have little chance to contact oil and are, for this reason, very effective in their blocking action and are very permanent. Earlier treatments of foaming-agent solution may also saturate the interface between the oil and water making later batches of foaming-agent solution available for the formation if better quality foams.

Whatever the explanation, the example described above and others have shown that successive small treatments of alternated foaming-agent solution and gas produce a greater degree of plugging, and a more permanent plug, than a single large treatment using the same volumes of foaming-agent solution and gas. Since at least part of this improvement is attributable to the plugging action of earlier treatments, and since the plugging action of at least the earlier slugs decreases with time, it will be obvious that the volumes of gas used to form the foam should be small and that each treatment should immediately follow the preceding one. There is a strong temptation to use a small treatment and then resume the oil-producing operation until the foam plug dissipates after which a second treatment is applied. Many of the effects of the first treatment on the second treatment are lost in such a procedure. For really effective results, the second treatment should immediately follow the first after the flow of a volume of gas not more than about 10 times as great as the foaming-agent solution volume, and preferably only about 3 times as great.

Another factor, which is obvious from the example, is that after about 3 cycles of foaming-agent solution followed by gas, little further flow of anything can occur. This means that if a plug is to be formed at some distance from the well, foam must be prevented from forming near the well. If foam does form near the well, it will be difficult, if not impossible, to displace a very large volume of foaming-agent solution to a distance of more than a few feet or even a few inches from the well. Even in plugging gas zones to decrease gas coning, it is usually desirable to plug the formation to a depth of at least 10 or 12 feet from the well. Therefore, it is usually desirable to use a bank of liquid, such as water, between the foaming-agent solution and gas so the foam does not form near the well bore, at least in the early stages of treatment.

When a rather highly effective and relatively oil-insensitive foaming agent, such as OK liquid, is used, 3 cycles of treatment are generally sufficient. As a matter of fact, the low flow rate through the plug after the third cycle of treatment in the example indicates it is not possible in such cases to use a fourth cycle of treatment. With less effective and more oil-sensitive agents, however, more cycles are possible and are advisable if an effective plug is to be formed. One of the advantages of my process is that by the use of a number of cycles of alternating foaming-agent solution and gas, it is possible to obtain an effective plug using a foaming agent which is not otherwise very effective.

In general, either water-soluble or oil-soluble foaming agents can be used. The water-soluble agents are preferred because of their lower cost and because at least some tendency of the foam to break in the presence of oil is desirable. This tendency to break with oil insures breakage of any foam which is formed in the oil zone if gas coning is the problem, or of foam which forms in the low-permeability zones if plugging of high-flow capacity channels or streaks in secondary recovery is the problem. Various suitable foaming agents are listed in Table I of U.S. Patent 3,330,346 Jacobs et al. Others are listed in U.S. Patent 3,318,379, Bond et al. Still others will occur to those skilled in the art. The agent to be used, as well as the concentration of such agent in the solution injected into the formation, will, of course, vary somewhat with the salinity of the water in which it is dispersed or dissolved, the nature of the brine and oil naturally present, the process in which the solution is to be used, and the like. In general, the agent should be used in a concentration of about 1 or 2 percent by weight of the solution. A concentration of less than about 0.1 percent usually is not advisable because the agent is lost too quickly by adsorption on formation surfaces, solution in the formation oil and brine, or the like. Concentrations as low as 0.1 percent by weight have been observed to produce some benefits, however. Concentrations in the range of about 5 to 10 percent may cause a change in the nature of the foam leading to less plugging action than is produced at lower foaming-agent concentrations. Therefore, use of more than about 5 or 10 percent is often inadvisable, not only because of the greater cost, but because of the poor results.

The volume of foaming-agent solution in a batch depends on the depth of plugging desired. This depth will rarely be less than 10 or 12 feet and will usually be somewhere in the range extending radially to from 25 to about 100 feet from the well. The volume of foam will generally be about 3 or 4 times the volume of foaming-agent solution. Therefore, the total volume of foaming-agent solution should be about ⅓ or ¼ the volume required to fill the formation pore space with foam out to the desired distance, generally from about 10 to 100 feet from the well. For most formations, this amouts to roughly from about 150 to about 15,000 gallons for each vertical foot of formation to be filled with foam. In the case of gas coning, this will be the gas zone, not the oil zone. In the case of secondary recovery, this will be the highly permeable streak possibly only a few inches thick, not the entire oil-bearing formation. If the foaming-agent solution is divided into 3 parts to be injected as 3 small batches, each followed by gas, the size of the batches or slugs will usually be about 50 to 5,000 gallons per foot of thickness of the zone to be plugged. It will be noted that this volume has nothing to do with the pore volume of the oil-bearing zone, a value commonly used in specifying volumes of treating liquids, particularly in secondary recovery operations. In more general terms, the volume of a batch of foaming-agent solution will be about $V/RN$ where $V$ is the pore volume of the portion of the formation which is to be filled with foam, $R$ is the ratio of the volume of gas to the volume of foaming-agent solution, and $N$ is the number of batches into which the foaming-agent soltuion is to be divided.

The volume of gas, as previously noted, should be about three times the volume of foaming-agent solution at formation conditions of temperature and pressure. No formations have been found where the volume of gas should be less than about 2 or more than about 4 times the volume of foaming-agent solution to form an effective foam. As previously noted, use of more gas than necessary may cause excessive foam collapse. Use of gas up to about 10 times the volume of foaming-agent solution may be advisable under some conditions, however.

The gas can be any inert gas such as air, nitrogen, flue gas, helium, or the like. For my purposes, the term "inert gas" means any gas which has little if any tendency to break the foam. Natural gas, which is mostly methane, is preferred if it is available at high pressures. Otherwise, use of compressed gases, such as nitrogen, may be more convenient.

If a spacer liquid is used, this liquid is preferably the solvent for the foaming agent. In most cases, this will be water or brine. Other low-cost liquids, such as isopropanol, usually tend to break foams. Some liquids, such as liquid ammonia, carbon disulfide, ethyl acetate, and the like, can be used with some foaming agents, provided that these liquids are inert. Again, the term "inert" means any liquid that has little if any tendency to break the foams. If an oil-soluble foaming agent is used, the solvent and the spacer liquid must be an inert liquid such as kerosene, toluene, turpentine, or even vegetable and fish oils.

The volume of the spacer liquid can vary from zero up to the volume of the foaming-agent solution. If a spacer liquid is used at all, preferably enough is employed to fill the zone into which the foaming-agent solution is injected to a radial distance of at least about 7 or 8 feet from the well. This prevents any contact of the gas with the foaming-agent solution in the critical zone of high-flow velocities extending out 10 or 12 feet from the well. As explained above, when gas is injected into a formation containing a foaming-agent solution, a volume of foam is formed equal to about 4 times the volume of foaming-agent solution. This is because as gas is injected into a liquid-filled formation, it must displace a volume of liquid equal to the volume of gas injected until the leading fingers of gas extend beyond the liquid-filled portion of the formation. Thus, some of the spacer liquid is displaced by gas. This spacer liquid displaces foaming-agent solution ahead of it. The result is that a volume of spacer liquid sufficient to fill the treated formation to a distance of about 7 or 8 feet from the well displaces the foaming-agent solution to a distance of about 10 or 12 feet before the gas penetrates the spacer liquid and enters the foaming-agent solution.

If the treatment is to be applied to a gas-coning problem, certain additional steps may be taken. For example, it is desirable to re-fill the gas cone in the oil zone with oil to increase the oil saturation and thus increase the flow of oil to the well. It is also advisable to take steps to avoid plugging the oil zone.

A packer is preferably set on open-ended tubing which extends through the packer. The packer is set at approximately the bottom of the gas zone and top of the oil zone. Oil can then be squeezed into the formation below the packer to eliminate the gas cone, re-saturating this portion of the formation with oil. The foaming-agent solution, spacer liquid, and gas slugs can then be injected down the annular space between the tubing and casing and into the gas zone. The oil zone is protected from the foam by the packer.

When gas-coning is serious, the vertical permeability is generally rather high. Therefore, foaming-agent solution, spacer liquid, and gas may be forced down into the oil zone at a short distance from the well, even though the packer protects the oil zone near the well. To avoid the formation of foam within the oil zone, it may be desirable to pump oil into the oil zone at the same time the foam-forming materials are pumped into the gas zone. It may also be advisable to use a rather oil-sensitive foaming agent, so any foam which forms in the oil zone will break quickly and will not greatly restrict the flow of oil to the well. The foam in the relatively oil-free gas zone, however, forms a strong, long-lasting foam even though it is oil-sensitive.

An example of the application of my process to a gas-coning situation is as follows. A well 5,600 feet deep penetrates an oil-producing formation extending from 5,540 feet to below the bottom of the well. The formation has a gas cap from 5,540 to 5,545 feet. Casing has been cemented to the bottom of the well and this casing has been perforated from 5,550 to 5,590 feet. Gas-coning has developed.

Perforations are formed from 5,540 to 5,545 feet. A packer is set on open-ended tubing at 5,548 feet.

A 2-percent solution of OK liquid foaming agent is prepared in fresh water. The volume of solution is 5,100 gallons (about 1,000 gallons per foot of gas zone to be filled). The top of the well is manifolded so either the foaming-agent solution, fresh water, or high-pressure nitrogen can be introduced down the well annulus while oil from the formation is being pumped down the tubing.

When the foaming agent solution has been prepared and the wellhead connections have been made, foaming-agent solution is pumped down the well annulus while oil is pumped down the tubing at about the same rate. The volume of the first batch of foaming-agent solution is about 1,700 gallons. The foaming-agent solution is followed by about 800 gallons of fresh water as a spacer liquid. Then, about 700 cubic feet of nitrogen (volume at formation pressure and temperature) are introduced down the annular space. While the spacer liquid and nitrogen are being injected, oil is being pumped slowly down the tubing and into the oil zone.

As soon as the 700 cubic feet of gas are introduced, a second 1,700-gallon batch of foaming agent is pumped down the well annulus and into the gas zone. This second batch of foaming-agent solution is followed by a second 800-gallon batch of fresh water and another 700 cubic feet of gas. The third 1,700-gallon batch of foaming-agent solution is then injected and is followed immediately by nitrogen. The spacer liquid is omitted to permit the formation of at least some foam near the well in the gas zone. Oil is pumped slowly down the tubing and into the oil-bearing zone during the second and third cycles of treatment.

After the last batch of nitrogen is injected, the injection pressures are released and the well is then put back on production with a greatly decreased gas production and increased oil production.

If the treatment is to be applied to a highly permeable streak in a formation to be subjected to a secondary recovery operation, such as a gas drive, or a waterflooding process, other special steps may be taken. For example, it is important to make a permeability profile log of the well to locate the high-flow capacity streak as accurately as possible and then isolate this streak with packers to avoid plugging the remainder of the oil-producing formation with foam.

The process is most applicable to formations in which the vertical permeability is much less than the horizontal permeability, so there is little leakage of foaming-agent solution and gas from the streak into the rest of the formation. In order to be very effective, the foam plug must extend to a considerable distance, such as 50 to 100 feet from the well. In order to form a foam plug at so great a distance from the well, it is necessary to use the spacer technique. The spacer technique also permits keeping the high-flow capacity streak clear of foam near the injection well to maintain injectivity of the driving gas or water. This technique of clearing the high-flow capacity streak near the well may be of little value in case vertical permeabilities are very low, but can be of considerable value with moderate vertical permeabilities.

In a secondary recovery oepration, the high-flow capacity streak should be plugged with foam, not only at the injection well, but also at the producing well. Here again, it is advisable to use a spacer liquid to avoid plugging the streak near the producing well. This improves the well's producing ability in cases where the vertical permeability is at least moderately high.

A somewhat oil-sensitive foaming agent may be used to avoid too seriously plugging portions of the oil-producing formation other than the highly peermeable streak. In this case, it is generally advisable to force water or gas into the highly permeable streak ahead of the foaming agent to remove as much of the oil as possible from this streak before it is contacted by the foaming-agent solution.

Still other special techniques will be apparent to those skilled in the art. For example, the two packers which isolate the zone to be plugged may be run on two strings of tubing, one opening between the packers and one opening below the bottom packer. This makes possible pumping oil into the oil-producing zone above the top packer and below the bottom packer as foaming-agent solution, spacer liquid and gas are introduced into the high-flow capacity streak. The purpose is to keep as much of the foam as possible out of the formation above and below the streak.

An example of the application of my process to a secondary recovery operation is as follows. An oil-bearing sandstone formation from about 3,100 to about 3,130 feet below the surface has been produced for many years through wells penetrating this formation. It has been decided to waterflood the formation. Measurement of core permeabilities shows the vertical permeability is only about 20 percent of horizontal permeability. Permeability profile logs of wells show a high-flow capacity zone or streak from about 3,120 to 3,122 feet. It is decided to plug this streak with foam before the waterflooding operation.

Casing has been set through the producing formation and perforated from about 3,102 to about 3,128 feet. In each of the wells in the area to be flooded, a retrievable bridging plug is set with the top of the packer element at about 3,122 feet. A retrievable packer on open-ended tubing is set at about 3,120 feet.

A 2-percent solution of OK liquid foaming agent in fresh water is prepared. A total of about 30,000 gallons is prepared for each well. A 50,000-gallon batch of water is injected down the tubing of each well and into the highly permeable streak to displace as much as possible of the oil from this streak before foaming-agent solution is injected. The water is followed by 10,000 gallons of foaming-agent solution. The foaming-agent solution is followed by about 2,000 gallons of water free from foaming agent as a spacer. Then, about 4,000 cubic feet of gas (volume at reservoir pressure and temperature) is injected to penetrate the spacer slug and the foaming-agent solution to form a foam. Immediately following the gas, another 10,000-gallon slug of foaming-agent solution is injected followed by another 2,000 gallons of water and 4,000 cubic feet of gas. In each well, the second slug is immediately followed by a third slug of the same size except for the spacer slug which is reduced to 500 gallons.

The result of this treatment is a foam block in the highly permeable streak extending to a distance of about 100 feet from each well. The small slug of spacer liquid in the final treatment prevents foam information in the zone 10 or 12 feet from the well.

It is to be noted that even in a 10-acre spacing with wells only 660 feet apart, the total 30,000 gallons of foaming-agent solution, or even the 12,000 cubic feet of gas in each well, is only a very small part of the total pore volume of the oil-producing formation. The gas is only about 0.005 pore volume and the foaming-agent solution is less than 0.002 pore volume. Since the total formation is not treated, however, but only a thin streak, these small volumes form a foam block extending out in the streak to more than 100 feet from each well.

After the treatment, packers are retrieved from the wells and waterflooding operations are initiated using a 9-spot flooding pattern with little channeling of water through the foam-plugged streak.

Many variations and alternates to the examples described above will be apparent to those skilled in the art. Therefore, I do not wish to be limited to the examples given, but only by the following claims.

I claim:
1. A method of plugging a zone of an earth formation penetrated by a well, the zone to be plugged being adjacent an oil-producing zone of said formation, said method comprising
   isolating said zone to be plugged from said oil-producing zone at the well,
   and introducing down said well and into said isolated zone to be plugged a series of batches of foaming agent solution, each batch of foaming-agent solution being followed by a volume of an inert gas, and each batch of foaming agent solution following the preceding batch of gas,
   the volume of each batch of foaming-agent solution being about $V/RN$ where V is the pore volume to be filled with foam, R is the ratio of the volume of gas to the volume of foaming-agent solution and N is the number of batches of foaming-agent solution to be injected, the gas volume being at formation temperature and pressure,
   R being from about 2 to about 10,
   and N being at least 2.

2. The method of claim 1 in which a batch of inert liquid, free from foaming agent, is injected between at least the first batch of foaming-agent solution and the first volume of gas, the volume of inert liquid being sufficient to fill said zone to be plugged to a radial distance of at least about 7 feet from said well, but being no greater than the volume of the preceding batch of foaming-agent solution.

3. The method of claim 1 in which said zone to be plugged is the gas zone of an oil-producing formation.

4. The method of claim 3 in which the gas zone is isolated from said oil-producing zone by setting a packer between the zones in the well and oil is squeezed into the oil-producing zone while foaming-agent solution and gas are being squeezed into said gas zone.

5. The method of claim 3 in which an oil-sensitive foaming-agent is used whereby any serious plugging of the oil-producing zone by foam is avoided.

6. The method of claim 1 in which said zone to be plugged is a high-flow capacity streak in an oil-producing formation and after the plugging operation the formation is subjected to a secondary recovery operation.

7. The method of claim 6 in which said zone to be plugged is penetrated by an injection well and a producing well, and both the injection and producing well are treated by the foam-plugging process.

8. The method of claim 6 in which a batch of inert liquid, free from foaming agent, is injected between each batch of foaming-agent solution and the following volume of gas, the volume of inert liquid being sufficient to fill said formation to a distance of at least about 7 feet from said well, but being no greater than the volume of the preceding batch of foaming-agent solution.

References Cited

UNITED STATES PATENTS

| | | | |
|---|---|---|---|
| 2,923,356 | 2/1960 | Glass et al. | 166—285 |
| 3,261,400 | 7/1966 | Elfrink | 166—269 X |
| 3,318,379 | 5/1967 | Bond et al. | 166—273 |
| 3,330,346 | 7/1967 | Jacobs et al. | 166—273 |
| 3,330,351 | 7/1967 | Bernard | 166—294 X |
| 3,335,792 | 8/1967 | O'Brien et al. | 166—273 |
| 3,366,175 | 1/1968 | Ferrell et al. | 166—269 X |
| 3,369,601 | 2/1968 | Bond et al. | 166—269 X |

DAVID H. BROWN, Primary Examiner

IAN A. CALVERT, Assistant Examiner

U.S. Cl. X.R.

166—273, 305